United States Patent
Aida et al.

(10) Patent No.: US 10,894,425 B2
(45) Date of Patent: Jan. 19, 2021

(54) PRINTING DEVICE, PRINTING DEVICE CONTROL METHOD AND WRITING DEVICE

(71) Applicant: Hitachi, Ltd., Tokyo (JP)

(72) Inventors: Kohhei Aida, Tokyo (JP); Yasuhiko Tada, Tokyo (JP); Hiroshi Sasaki, Tokyo (JP); Masahiro Kawasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/301,925

(22) PCT Filed: Mar. 8, 2017

(86) PCT No.: PCT/JP2017/009321
§ 371 (c)(1),
(2) Date: Nov. 15, 2018

(87) PCT Pub. No.: WO2017/199549
PCT Pub. Date: Nov. 23, 2017

(65) Prior Publication Data
US 2019/0286176 A1    Sep. 19, 2019

(30) Foreign Application Priority Data

May 18, 2016   (JP) ................. 2016-099627

(51) Int. Cl.
*B41J 2/045*    (2006.01)
*B41J 2/195*    (2006.01)
(Continued)

(52) U.S. Cl.
CPC .............. *B41J 2/211* (2013.01); *B41J 2/01* (2013.01); *B41J 2/04563* (2013.01); *B41J 2/175* (2013.01);
(Continued)

(58) Field of Classification Search
CPC ...................................... B41J 2/211
See application file for complete search history.

(56) References Cited

U.S. PATENT DOCUMENTS 6,712,461 B2 *   3/2004   Haan ............... B41J 2/17546
                                                  347/17
2009/0050049 A1   2/2009   Craig et al.
(Continued)

FOREIGN PATENT DOCUMENTS

JP       52-169430      12/1977
JP       7-38931 U       7/1995
(Continued)

OTHER PUBLICATIONS

Machine generated English translation of JP 2014004795 to Ozawa et al., "Reversible Thermochromic Printed Matter"; translation generated via espace.net on Jul. 1, 2020 ; 16pp.*
(Continued)

*Primary Examiner* — Shelby L Fidler
(74) *Attorney, Agent, or Firm* — Crowell & Moring LLP

(57) ABSTRACT

This printing device is provided with a first ink container that contains a first ink; a second ink container that contains a second ink; temperature adjusting units that adjust the temperature of the first ink contained in the first ink container and/or the temperature of the second ink contained in the second ink container; a nozzle that sprays the inks; and a control unit that controls the first temperature adjusting unit and the second temperature adjusting unit.

8 Claims, 9 Drawing Sheets

(51) Int. Cl.

| | | |
|---|---|---|
| *C09D 11/50* | (2014.01) | |
| *B41J 2/21* | (2006.01) | |
| *G01K 11/12* | (2006.01) | |
| *B41J 2/01* | (2006.01) | |
| *B41J 2/175* | (2006.01) | |
| *B43K 5/18* | (2006.01) | |
| *B42D 25/378* | (2014.01) | |

(52) U.S. Cl.
CPC .............. *B41J 2/195* (2013.01); *B41J 2/2107* (2013.01); *B42D 25/378* (2014.10); *B43K 5/18* (2013.01); *C09D 11/50* (2013.01); *G01K 11/12* (2013.01)

(56) References Cited

U.S. PATENT DOCUMENTS

| | | | | |
|---|---|---|---|---|
| 2011/0242155 | A1* | 10/2011 | Bansyo | .................... B41J 2/175 347/6 |
| 2013/0100215 | A1 | 4/2013 | Kuki et al. | |
| 2013/0293603 | A1 | 11/2013 | Roof et al. | |
| 2014/0063149 | A1* | 3/2014 | Sato | .................... B41J 2/17503 347/86 |
| 2014/0118430 | A1 | 5/2014 | Ghozeil et al. | |
| 2015/0047552 | A1 | 2/2015 | Ortais | |
| 2015/0352837 | A1 | 12/2015 | Kuki et al. | |
| 2017/0232755 | A1* | 8/2017 | Fujita | ....................... B41J 2/175 347/7 |
| 2020/0041359 | A1* | 2/2020 | Aida | ................ G05B 19/41875 |

FOREIGN PATENT DOCUMENTS

| | | | |
|---|---|---|---|
| JP | 2003-214961 | A | 7/2003 |
| JP | 2003-220714 | A | 8/2003 |
| JP | 2003-315167 | A | 11/2003 |
| JP | 2005-271365 | A | 10/2005 |
| JP | 2007-1128 | A | 1/2007 |
| JP | 2007-106979 | A | 4/2007 |
| JP | 2009-503455 | A | 1/2009 |
| JP | 2009-204573 | A | 9/2009 |
| JP | 2011-51094 | A | 3/2011 |
| JP | 2013-233801 | A | 11/2013 |
| JP | 2014004795 | A * | 1/2014 |
| JP | 2014-79885 | A | 5/2014 |
| JP | 2015-3453 | A | 1/2015 |
| JP | 2015-63139 | A | 4/2015 |
| JP | 2016-7729 | A | 1/2016 |
| WO | WO-2009106242 | A1 * | 9/2009 ........... B42D 25/378 |
| WO | WO 2016/024455 | A1 | 2/2016 |

OTHER PUBLICATIONS

Extended European Search Report issued in counterpart European Application No. 17798984.5 dated Nov. 22, 2019 (12 pages).

International Search Report (PCT/ISA/210) issued in PCT Application No. PCT/JP2017/009321 dated May 16, 2017 with English translation (eight (8) pages).

Japanese-language Written Opinion (PCT/ISA/237) issued in PCT Application No. PCT/JP2017/009321 dated May 16, 2017 (six (6) pages).

Japanese-language Office Action issued in counterpart Japanese Application No. 2018-518116 dated Jul. 9, 2019 with unverified English translation (eight pages).

* cited by examiner

PRINTING DEVICE, PRINTING DEVICE CONTROL METHOD AND WRITING DEVICE

TECHNICAL FIELD

The present invention relates to a printing device, a printing device control method and a writing device.

BACKGROUND ART

Perishable foods, frozen foods or low-temperature preservation pharmaceuticals such as vaccines or biopharmaceuticals require cold chains that keep them at low temperatures without interruption in the distribution process of production, transportation and consumption. In actual situations, shipping containers are occasionally equipped with data loggers that can usually record time and temperature continuously in order to constantly measure/record temperature during distribution, so it is possible to clarify where the responsibility lies if there is damage to a product. Furthermore, a method of guaranteeing the quality of individual products uses temperature indicators. The temperature indicators do not provide recording accuracy that is as good as data loggers, but can be affixed to individual products, and their surfaces become stained if temperature becomes higher than or lower than a preset temperature, so it is possible to know changes in the temperature environment.

However, the managed temperature ranges of vaccines and biopharmaceuticals are 2 to 8° C., and sensing of both temperature increase (to a temperature equal to or higher than 8° C.) and temperature decrease (to a temperature equal to or lower than 2° C.) is demanded. As in this case, if temperature management in a certain temperature range is demanded, data loggers are the most useful. On the other hand, data loggers are not suited for management of individual products for their prices and sizes as mentioned above.

Patent Literature 1 (Japanese Unexamined Patent Application Publication No. 2016-7729) discloses a method of forming, on a base material, a marking that becomes colored when temperature thereof becomes equal to or higher than a prescribed temperature, the marking method including: a first step of forming a first member including a developer or a color former on the base material; a second step of forming a barrier layer to coat the first member; and a third step of forming, on the barrier layer, a second member including the other one of a developer or a color former than the one included in the first member, wherein at least one of the first step or the third step has a step of turning a liquid including the developer into a droplet or color former and a step of depositing droplets of the liquid on the base material or barrier layer (see claim 1). In addition, it discloses an ink let printer that has: an ink container that stores an ink; an ink jet head that ejects droplets of the ink; and an ink supply path that supplies the ink from the ink container to the ink jet head, the ink jet printer forming a given pattern on a printing object with the droplets of the ink, wherein the ink jet printer has a cooling device that can cool at least part of the ink to keep it at a temperature lower than 15° C. Celsius (see claim 6).

CITATION LIST

Patent Literature

Patent Literature 1: Japanese Unexamined Patent Application Publication No. 2016-7729

SUMMARY OF INVENTION

Technical Problem

However, the marking formed by the marking method or ink jet printer disclosed in Patent Literature 1 has enabled sensing of temperature becoming equal to or higher than a prescribed temperature, but has not enabled sensing of temperature becoming equal to or lower than a prescribed temperature.

In view of this, an object of the present invention is to provide a printing device, printing device control method and writing device that enable printing of a print pattern that enables sensing of both temperature increase and temperature decrease.

Solution to Problem

To solve such problems, a printing device according to the present invention is characterized by including: a first ink container that contains a first ink; a second ink container that contains a second ink; a temperature adjusting unit that adjusts at least either temperature of the first ink contained in the first ink container or temperature of the second ink contained in the second ink container; a nozzle that sprays an ink; and a control unit that controls the temperature adjusting unit.

In addition, a printing device control method according to the present invention is characterized by including: a first ink container that contains a first ink; a second ink container that contains a second ink; a first temperature adjusting unit that adjusts temperature of the first ink contained in the first ink container; a second temperature adjusting unit that adjusts temperature of the second ink contained in the second ink container; a nozzle that sprays an ink; and a control unit that controls the first temperature adjusting unit and the second temperature adjusting unit, wherein the control unit: controls the first temperature adjusting unit to adjust temperature of the first ink to a temperature equal to or lower than the temperature $T_{d1}$, and thereafter adjusts the temperature to a temperature $T_0$ which is a temperature higher than a temperature $T_{d2}$ and lower than a temperature $T_{a1}$; and controls the second temperature adjusting unit to adjust temperature of the second ink to a temperature equal to or higher than a temperature $T_{a2}$, and thereafter adjusts the temperature to the temperature $T_0$.

In addition, a writing device according to the present invention is characterized by including: a first ink container that contains a first ink; a second ink container that contains a second ink; an ink container to which the first ink and the second ink are supplied; a writing unit to which a mixed ink in the ink container is supplied; a heat insulating portion that insulates the first ink container from the second ink container; and a heat conducting part that is in heat conduction with the second ink container.

Advantageous Effects of Invention

According to the present invention, a printing device, printing device control method and writing device that enable printing of a print pattern that enables sensing of both temperature increase and temperature decrease can be provided.

DESCRIPTION OF EMBODIMENTS

Hereinafter, embodiments for implementing the present invention (hereinafter, referred to as "embodiments") are explained in detail with reference to the drawings as appropriate. Note that in individual drawings, common portions are given the same signs, and the same explanations are not repeated.

First Embodiment

<Printing Device>

Figure 1:
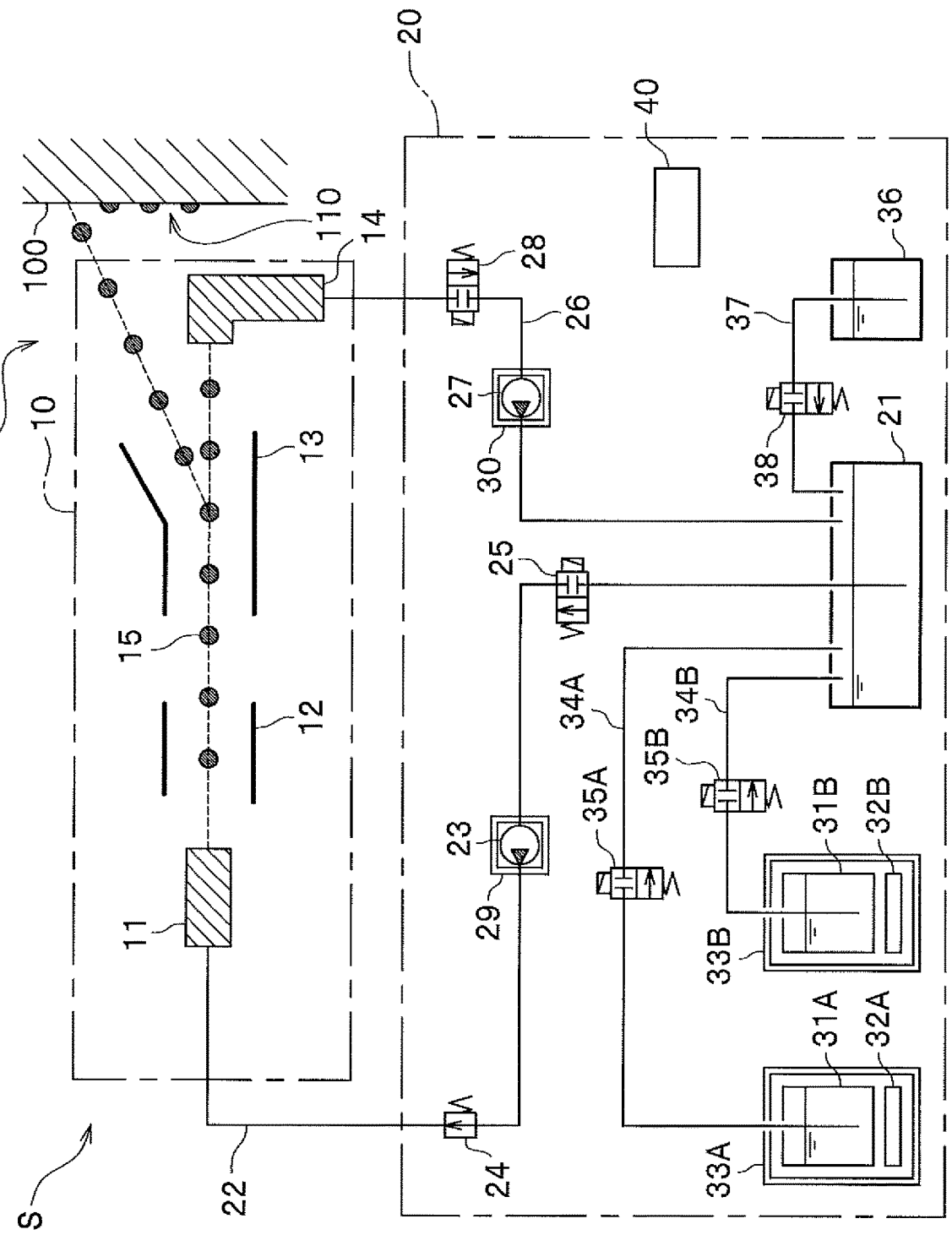
FIG. 1 is a configurational schematic diagram of a printing device according to a first embodiment.

The configuration of a printing device S according to a first embodiment is explained using FIG. 1. FIG. 1 is a configurational schematic diagram of the printing device S according to a first embodiment.

The printing device S according to the first embodiment is a charge-control type ink jet printer, including an ink jet head 10 and a printing device body 20. The printing device S is configured to be able to spray ink droplets 15 from the ink jet head 10 (nozzle 11) and print a print pattern (a temperature indicator 110) on a printing object 100. Note that a print pattern printed on the printing object 100 by the printing device S according to the first embodiment is not limited to characters, but may be marks, figures or the like. In addition, the printing object 100 is temperature-managed, and the printing device S and printing object 100 are arranged in a temperature-adjusted space R having temperature/humidity or the like adjusted by an indoor temperature adjusting device (not illustrated). Note that in the following explanation, the inside of the temperature-adjusted space R is adjusted to a temperature $T_0$.

The ink jet head 10 includes the nozzle 11, a charging electrode 12, a deflecting electrode 13, and a gutter 14.

The printing device body 20 includes a main container 21, an ink supply path 22, an ink recovery path 26, a first ink container 31A, a first temperature adjusting mechanism 32A, a first heat insulating wall 33A, a first ink supplementation path 34A, a second ink container 31B, a second temperature adjusting mechanism 32B, a second heat insulating wall 33B, a second ink supplementation path 34B, a solvent container 36, a solvent supplementation path 37, and a control unit 40.

In addition, the ink supply path 22 is provided with a supply pump 23, an adjusting valve 24, and an on-off valve 25. The ink recovery path 26 is provided with a recovery pump 27 and an on-off valve 28. The first ink supplementation path 34A is provided with an on-off valve 35A. The second ink supplementation path 34B is provided with an on-off valve 35B. The solvent supplementation path 37 is provided with an on-off valve 38.

Note that the supply pump 23 and recovery pump 27 include liquid supply units (not illustrated) that supplies liquid (inks) and motor units (not illustrated) that drive the liquid supply units. The supply pump 23 and recovery pump 27 are covered by heat insulating walls 29, 30, and are configured not to transfer heat generated in the motor units to the inside of the printing device body 20 (the main container 21 and the like) or the temperature-adjusted space R. In addition, they are preferably structured to hinder transfer of heat of the motor units to the liquid supply units. In other words, they are preferably structured to hinder temperature change of inks to be supplied by the liquid supply units due to heat generation at the motor units. The insides of the heat insulating walls 29, 30 are preferably configured to be able to dissipate heat to the outside of the temperature-adjusted space R by unillustrated cooling means. Note that although the heat insulating walls 29, 30 are explained as covering the entire pumps, this is not the sole example. The motor units (not illustrated) may be covered by the insulating walls 29, 30, and the liquid supply units may be arranged outside the insulating walls 29, 30.

An ink (a "mixed ink" mentioned below) contained in the main container 21 is supplied by the supply pump 23 through the ink supply path 22 to the nozzle 11, and is ejected as the ink droplets 15 from the nozzle 11. At this time, the pressure of the ink droplets 15 ejected from the nozzle 11 is adjusted by the supply pump 23 and adjusting valve 24 provided to the ink supply path 22.

The ink droplets 15 ejected from the nozzle 11 are provided with electric charges at the charging electrode 12, and thereafter are controlled by the deflecting electrode 13 in terms of their flight direction, and impact on the printing object 100 to form a print pattern (the temperature indicator 110). In addition, the ink droplets 15 not used for printing are captured by the gutter 14. The ink captured by the gutter 14 is collected in the main container 21 through the ink recovery path 26 by the recovery pump 27.

A first ink mentioned below is contained in the first ink container 31A. The first temperature adjusting mechanism 32A is arranged inside the first heat insulating wall 33A together with the first ink container 31A, and is configured to be able to adjust (raise/lower) the temperature in the first heat insulating wall 33A, that is, adjust the temperature of the first ink contained in the first ink container 31A. Note that the first temperature adjusting mechanism 32A is controlled by the control unit 40. In addition, at the time of adjusting the temperature with the first temperature adjusting mechanism 32A, as it is insulated by the first heat insulating wall 33A, influence on the temperature of the inside of the printing device body 20 (the main container 21 and the like) or the temperature-adjusted space R is sufficiently small. The first ink supplementation path 34A is configured to be able to supply the first ink contained in the first ink container 31A to the main container 21.

A second ink mentioned below is contained in the second ink container 31B. The second temperature adjusting mechanism 32B is arranged inside the second heat insulating wall 33B together with the second ink container 31B, and is configured to be able to adjust (raise/lower) the temperature inside the second heat insulating wall 33B, that is, adjust the temperature of the second ink contained in the second ink container 31B. Note that the second temperature adjusting mechanism 32B is controlled by the control unit 40. In addition, at the time of adjusting the temperature with the second temperature adjusting mechanism 32B, as it is insulated by the second heat insulating wall 33B, influence on the temperature of the inside of the printing device body 20 (the main container 21 and the like) or the temperature-adjusted space R is sufficiently small. The second ink supplementation path 34B is configured to be able to supply the second ink contained in the second ink container 31B to the main container 21.

That is, the printing device S according to the first embodiment is configured to be able to temperature-adjust the first ink and the second ink independently, mix the first ink after temperature adjustment and the second ink after temperature adjustment in the main container 21 to form a mixed ink, and print with the mixed ink. Note that the mixed ink contained in the main container 21, and the mixed ink that circulates through the ink supply path 22, nozzle 11, gutter 14 and ink recovery path 26 are adjusted to a predetermined temperature by the temperature-adjusted space R being temperature-adjusted by an indoor temperature adjusting device (not illustrated).

A solvent is contained in the solvent container 36. The solvent supplementation path 37 is configured to be able to supply the solvent contained in the solvent container 36 to the main container 21. Note that the main container 21 is provided with a viscosity detecting device (not illustrated) that detects the viscosity of an ink contained therein, and if the viscosity of the ink becomes higher than a prescribed value due to volatilization of the solvent, supplements the main container 21 with the solvent. In addition, the main container 21 is provided with a viscosity detecting device (not illustrated) that stirs an ink contained therein, and can stir and mix the ink and the solvent.

The entire printing device S according to the first embodiment is configured to be able to be controlled by the control unit 40 controlling the charging electrode 12, deflecting electrode 13, first temperature adjusting mechanism 32A, second temperature adjusting mechanism 32B, supply pump 23, adjusting valve 24, recovery pump 27 and on-off valves 25, 28, 35A, 35B, 38.

<Ink, Temperature Indicator>

Next, inks to be used in the printing device S according to the first embodiment are explained. The first ink in the first ink container 31A is an ink that shows color change (color-development/decoloration) reversibly as a result of temperature change, and is an ink that shows a hysteresis color-changing phenomenon in which a temperature (hereinafter referred to as a "first decoloration start temperature") $T_{a1}$ at which decoloration starts at the time of temperature increase and a temperature (hereinafter referred to as a "first color-development start temperature") $T_{d1}$ at which color-development starts at the time of temperature decrease are different from each other. In addition, the second ink in the second ink container 31B is an ink that shows color change (color-development/decoloration) reversibly as a result of temperature chancre, and is an ink that shows a hysteresis color-changing phenomenon in which a temperature (hereinafter referred to as a "second decoloration start temperature") $T_{a2}$ at which decoloration starts at the time of temperature increase and a temperature (hereinafter referred to as a "second color-development start temperature") $T_{d2}$ at which color-development starts at the time of temperature decrease are different from each other.

Here, the combination of the first ink and the second ink is selected to satisfy a relationship among the first decoloration start temperature $T_{a1}$, first color-development start temperature $T_{d1}$, second decoloration start temperature $T_{a2}$ and second color-development start temperature $T_{d2}$ of "$T_{d1} < T_{d2} < T_{a1} < T_{a2}$".

In addition, although details are mentioned below, the temperature indicator 110 made of the first ink and second ink senses deviation to a temperature equal to or lower than the second color-development start temperature $T_{d2}$ and deviation to a temperature equal to or higher than the first decoloration start temperature $T_{a1}$. In other words, the temperature indicator 110 made of the first ink and second ink can judge whether or not there is deviation of temperature out of the temperature range from the second color-development start temperature $T_{d2}$ to the first decoloration start temperature $T_{a1}$. Because of this, it is possible to set the managed temperature range of the temperature indicator 110 by selecting a combination the first ink and second ink considering the managed temperature range (for example, 2 to 8° C.) of a temperature-managed object (for example, a container sealing in vaccines or biopharmaceuticals).

Figure 2:
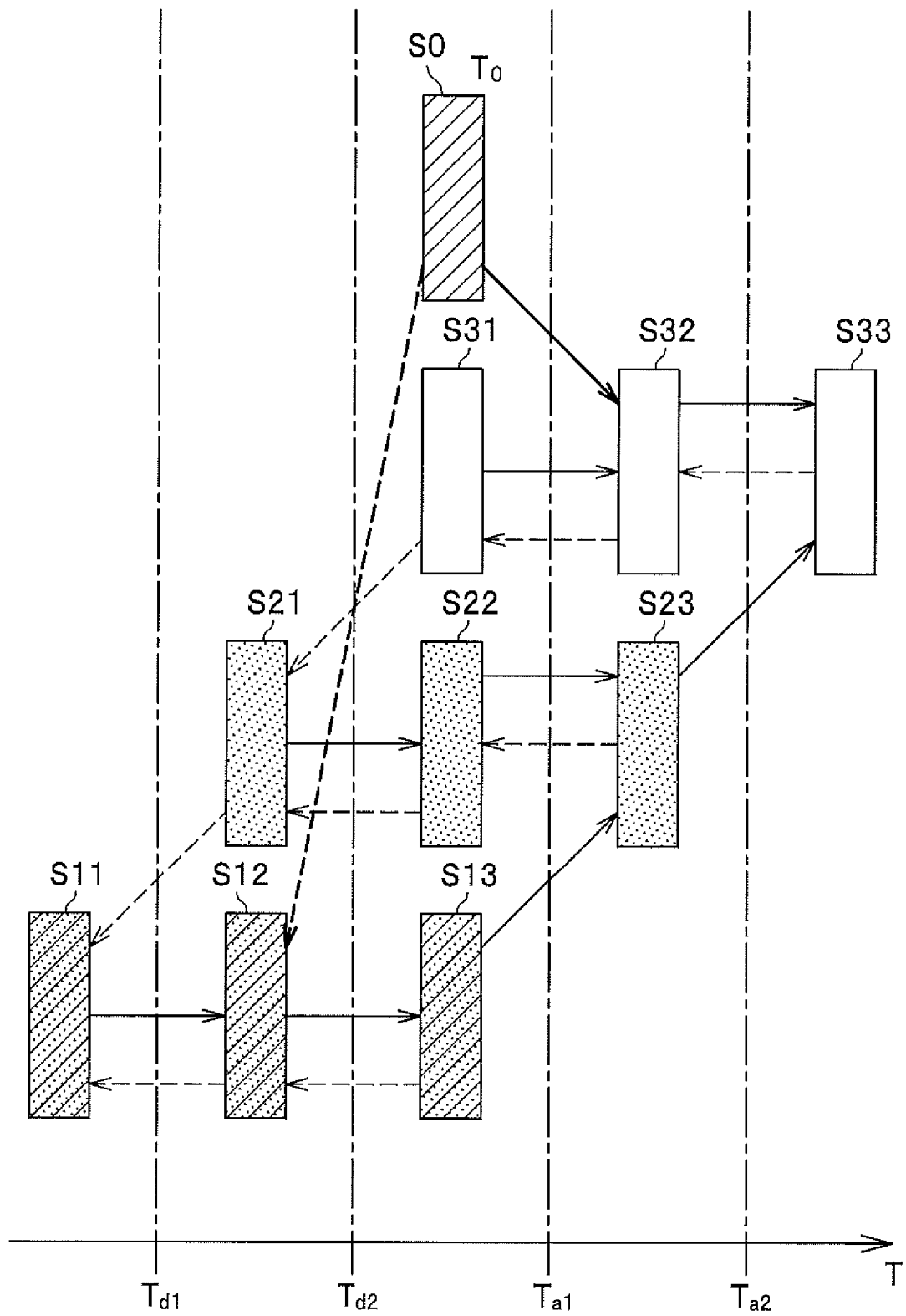
FIG. 2 is a transition diagram showing the transition of color change of a temperature indicator as a result of temperature change.

A method of sensing deviation from the managed temperature range by the temperature indicator 110 is explained using FIG. 2. FIG. 2 is a transition diagram showing the transition of color change of the temperature indicator 110 as a result of temperature change. Here, S0 to S33 indicate the states of the color of the temperature indicator 110, color-development of the first ink is indicated by hatching drawn from the upper right to the lower left, and color-development of the second ink is indicated with dotted mesh. In addition, transitions as a result of temperature increase are indicated with solid arrows, and transitions as a result of temperature decrease are indicated with dashed arrows. In addition, dash-dotted lines indicate boundaries between individual temperatures ($T_{d1}$, $T_{d2}$, $T_{a1}$, $T_{a2}$), and ones on the right side in FIG. 2 correspond to higher temperatures.

The initial temperature $T_0$ of the temperature indicator 110 satisfies "$T_{d2} < T_0 < T_{a1}$". In this state, the first ink is color-developed, and the second ink is decolored (initial state S0).

Here, if the temperature deviates to a temperature equal to or lower than the second color-development start temperature $T_{d2}$ from the initial state S0, the second ink becomes color-developed (S12). In order to decolor the second ink again from this state, it is necessary to raise the temperature to a temperature equal to or higher than the second decoloration start temperature $T_{a2}$, but the first ink becomes decolored before the second ink becomes decolored (S13, S23, S33). Then, in order to color-develop the first ink again from this state, it is necessary to lower the temperature to a temperature equal to or lower than the first color-development start temperature $T_{d1}$, but the second ink becomes color-developed before the first ink becomes color-developed (S32, S31, S21, S11).

Likewise, if the temperature deviates to a temperature equal to or higher than the first decoloration start temperature $T_{a1}$ from the initial state S0, the first ink becomes decolored (S32). In order to color-develop the first ink again from this state, it is necessary to lower the temperature to a temperature equal to or lower than the first color-development start temperature $T_{d1}$, but the second ink becomes color-developed before the first ink becomes color-developed (S31, S21, S11). Then, in order to decolor the second ink again from this state, it is necessary to raise the temperature to a temperature equal to or higher than the second decoloration start temperature $T_{a2}$, but the first ink becomes decolored before the second ink becomes decolored (S12, S13, S23, S33).

In this manner, the temperature indicator 110 is configured to be unable to return to the initial state S0 (the state where the first ink is color-developed, and the second ink is decolored) once its temperature deviates from the managed temperature range from the second color-development start temperature $T_{d2}$ to the first decoloration start temperature $T_{a1}$. Thereby, the temperature indicator 110 can sense deviation from the managed temperature range.

<Control of Printing Device>

Figure 3:
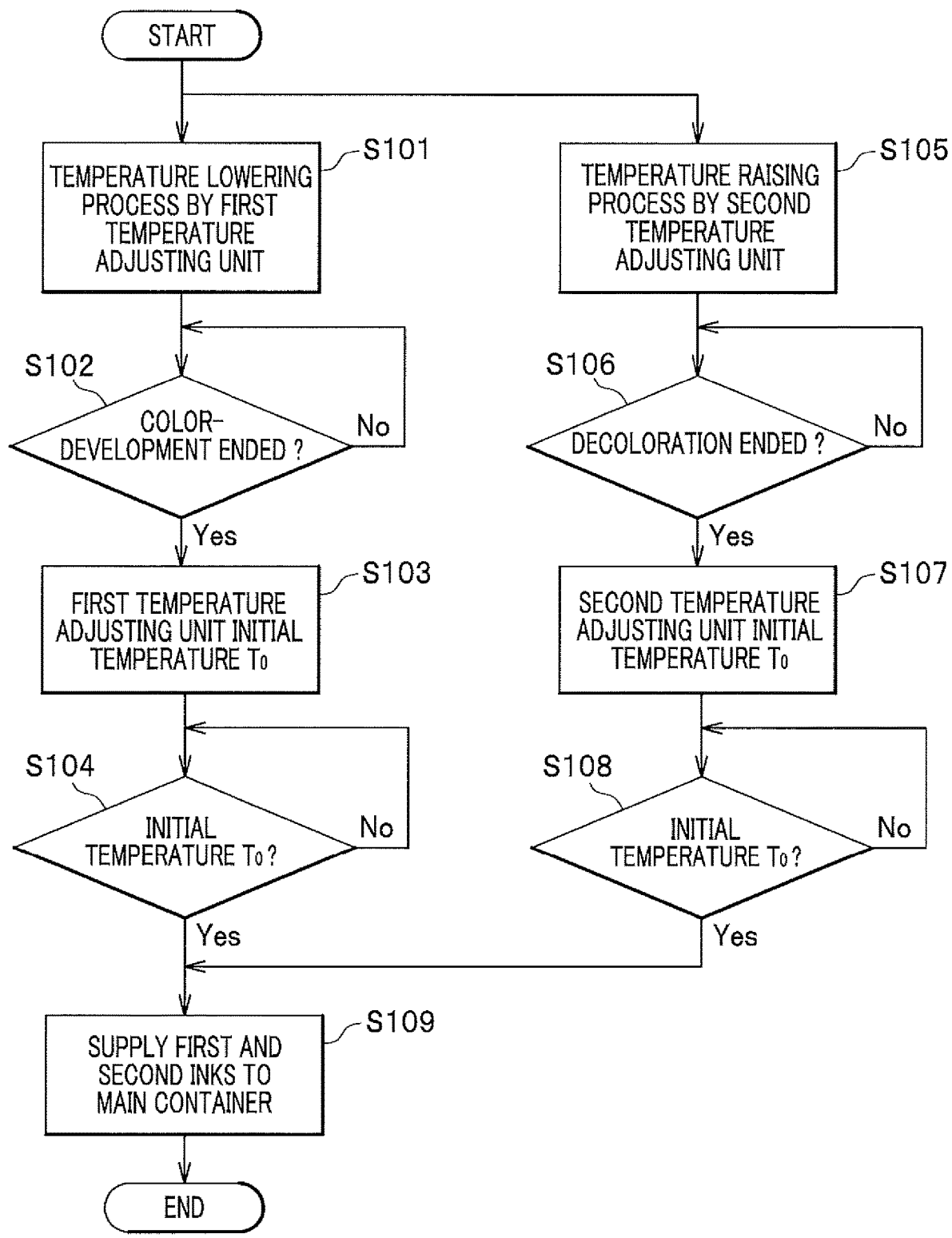
FIG. 3 is a flowchart showing preprocessing of inks in the printing device according to the first embodiment.

Control of the printing device S according to the first embodiment is explained using FIG. 3. FIG. 3 is a flowchart showing preprocessing of inks in the printing device S according to the first embodiment.

At Step S101, the control unit 40 controls the first temperature adjusting mechanism 32A to lower (cool) the temperature inside the first heat insulating wall 33A. Specifically, the temperature of the first ink contained in the first ink container 31A is adjusted to a temperature equal to or lower than the first color-development start temperature $T_{d1}$. Thereby, the first ink starts becoming color-developed.

At Step S102, the control unit 40 judges whether or not color-development of the first ink has ended. For example, after the lapse of predetermined time after the temperature of the first ink is adjusted to a temperature equal to or lower than the first color-development start temperature $T_{d1}$, it is judged that the color-development of the first ink has ended. If it is judged that the color-development of the first ink has not ended (S102: No), the control unit 40 repeats the process at Step S102. If it is judged that the color-development of the first ink has ended (S102: Yes), the control unit 40 proceeds to perform the process at Step S103

At Step S103, the control unit 40 controls the first temperature adjusting mechanism 32A to adjust the temperature inside the first heat insulating wall 33A to the initial temperature $T_0$. That is, the temperature of the first ink contained in the first ink container 31A is adjusted to the initial temperature $T_0$. Here, when the first ink is heated to adjust the temperature to the initial temperature $T_0$, attention is paid not to make the temperature exceed the first decoloration start temperature $T_{a1}$.

At Step S104, the control unit 40 judges whether or not the temperature of the first ink contained in the first ink container 31A is equal to the initial temperature $T_0$. If it is judged that the temperature of the first ink is not the initial temperature $T_0$ (S104: No), the control unit 40 repeats the process at Step S104. If it is judged that the temperature of the first ink is equal to the initial temperature $T_0$ (S104: Yes), the control unit 40 proceeds to perform the process at Step S109.

In addition, at Step S105, the control unit 40 controls the second temperature adjusting mechanism 32B to raise (heat) the temperature inside the second heat insulating wall 33B. Specifically, the temperature of the second ink contained in the second ink container 31B is adjusted to a temperature equal to or higher than the second decoloration start temperature $T_{a2}$. Thereby, the second ink starts becoming decolored.

At Step S106, the control unit 40 judges whether or not decoloration of the second ink has ended. For example, after the lapse of predetermined time after the temperature of the second ink is adjusted to a temperature equal to or higher than the second decoloration start temperature $T_{a2}$, it is judged that the decoloration of the second ink has ended. If it is judged that the decoloration of the second ink has not ended (S106: No), the control unit 40 repeats the process at Step S106. If it is judged that the decoloration of the second ink has ended (S106: Yes), the control unit 40 proceeds to perform the process at Step S107.

At Step S107, the control unit 40 controls the second temperature adjusting mechanism 32B to adjust the temperature inside the second heat insulating wall 33B to the initial temperature $T_0$. That is, the temperature of the second ink contained in the second ink container 31B is adjusted to the initial temperature $T_0$. Here, when the second ink is cooled to adjust the temperature to the initial temperature $T_0$, attention is paid not to make the temperature exceed the second color-development start temperature $T_{d2}$.

At Step S108, the control unit 40 judges whether or not the temperature of the second ink contained in the second ink container 31B is equal to the initial temperature $T_0$. If it is judged that the temperature of the second ink is not the initial temperature $T_0$ (S108: No), the control unit 40 repeats the process at Step S108. If it is judged that the temperature of the second ink is equal to the initial temperature $T_0$ (S108: Yes), the control unit 40 proceeds to perform the process at Step S109.

Note that the processes shown in Step S101 to Step S104 and the processes shown in Step S105 to Step S108 may be processed in parallel as shown in FIG. 3, or either the former processes or the latter processes may be performed first, and then the other processes may be performed.

The control unit 40 performs the process at Step S109 after both the process shown in Step S104 and the process shown in Step S108 are ended. At Step S109, the control unit 40 controls the on-off valve 35A to open the first ink supplementation path 34A and supply the first ink in the first ink container 31A to the main container 21, and additionally controls the on-off valve 35B to open the second ink supplementation path 34B and supply the second ink in the second ink container 31B to the main container 21. Note that supply of the first ink from the first ink container 31A to the main container 21 may be performed by an illustrated pump, or may be performed using a pressure difference or a difference in height. The same applies to supply of the second ink from the second ink container 31B to the main container 21. When the supply of the first and second inks ends, the control unit 40 ends the ink preprocessing flow shown in FIG. 3.

In the aforementioned manner, the printing device S according to the first embodiment can form a mixed ink which is at the initial temperature $T_0$ and in which only the first ink is in the color-developed state by mixing, in the main container 21, the first ink which is at the initial temperature $T_0$ and in the color-developed state and the second ink which is at the initial temperature $T_0$ and in the decolored state. Then, the printing device S according to the first embodiment can print a print pattern (the temperature indicator 110) on the printing object 100 by spraying the mixed ink in this state as the ink droplets 15 from the ink jet head 10 (the nozzle 11). In addition, the print Pattern printed by the printing device S according to the first embodiment is configured to be unable to return to the initial state once its temperature deviates from the managed temperature range from the second color-development start temperature $T_{d2}$ to the first decoloration start temperature $T_{a1}$. Thereby, the temperature indicator 110 can sense deviation from the managed temperature range.

Second Embodiment

Figure 4:
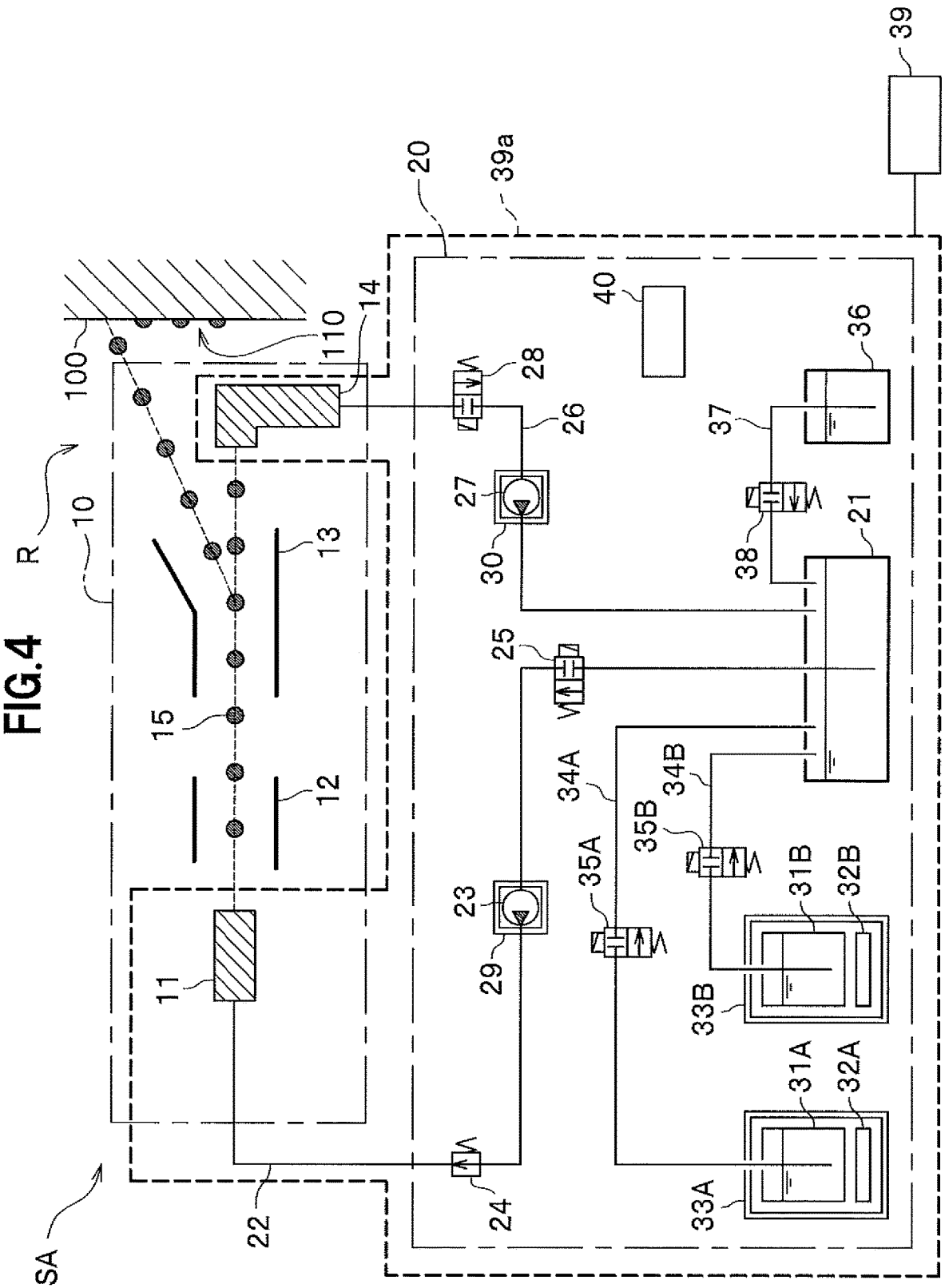
FIG. 4 is a configurational schematic diagram of a printing device according to a second embodiment.

A printing device SA according to a second embodiment is explained using FIG. 4. FIG. 4 is a configurational schematic diagram of the printing device SA according to the second embodiment.

The printing device S according to the first embodiment is configured to adjust, to a predetermined temperature (the initial temperature $T_0$), temperatures of the mixed ink contained in the main container 21 and the mixed ink circulating through the inside of the printing device S (the ink supply path 22, nozzle 11, gutter 14 and ink recovery path 26) by the indoor temperature adjusting device (not illustrated) temperature-adjusting the temperature-adjusted space R. In contrast, the printing device SA according to the second embodiment includes an internal temperature adjusting mechanism 39. A range to be temperature-adjusted by the internal temperature adjusting mechanism 39 is indicated with a dashed line 39a. That is, the internal temperature adjusting mechanism 39 can adjust, to a predetermined temperature (the initial temperature $T_0$), temperatures of the mixed ink contained in the main container 21 and the mixed ink circulating through the inside of the printing device SA (the ink supply path 22, nozzle 11, gutter 14 and ink recovery path 26). In other words, the internal temperature adjusting mechanism 39 is configured to perform temperature management such that the temperatures become higher than the second color-development start temperature $T_{d2}$ and lower than the first decoloration start temperature $T_{a1}$. Thereby, the printing device SA according to the second embodiment can suitably manage the temperatures of the mixed inks before printing.

Third Embodiment

Figure 5:
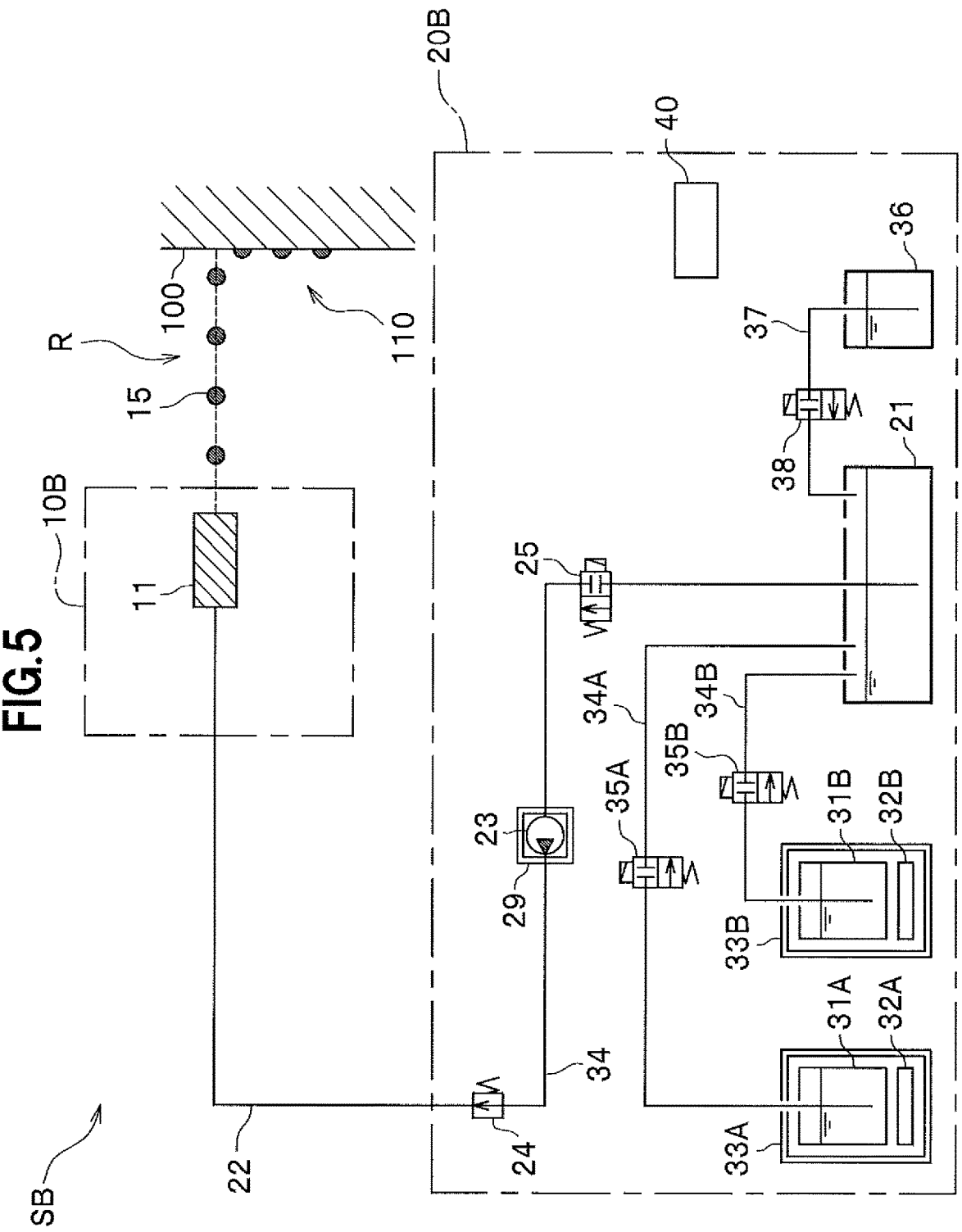
FIG. 5 is a configurational schematic diagram of a printing device according to a third embodiment.

A printing device SB according to a third embodiment is explained using FIG. 5. FIG. 5 is a configurational schematic diagram of the printing device SB according to the third embodiment.

The printing device SB according to the first embodiment is a circulation type (charge-control type) ink jet printer. In contrast, the printing device SB according to the third embodiment is a DOD (Drop On Demand) type ink jet printer that sprays the ink droplets 15 from the nozzle 11 at the time of printing, and includes an ink jet head 10B and a printing device body 20B.

The ink jet head 10B includes the nozzle 11. The printing device body 20B includes the main container 21, ink supply path 22, first ink container 31A, first temperature adjusting mechanism 32A, first heat insulating wall 33A, first ink supplementation path 34A, second ink container 31B, second temperature adjusting mechanism 32B, second heat insulating wall 33B, second ink supplementation path 34B, solvent container 36, solvent supplementation path 37 and control unit 40. In addition, the ink supply path 22 is provided with the supply pump 23, adjusting valve 24 and on-off valve 25. The first ink supplementation path 34A is provided with the on-off valve 35A. The second ink supplementation path 34B is provided with the on-off valve 35B. The solvent supplementation path 37 is provided with the on-off valve 38.

The printing device SB according to the third embodiment for example controls spray/stop of the ink droplets 15 by a piezo element (piezoelectric element) provided to the nozzle 11 changing its volume as a result of energization or by a solenoid valve provided to the nozzle 11 opening and closing as a result of energization.

It is configured in the same manner as the printing device S according to the first embodiment in other respects, and the same explanations are not repeated.

In the aforementioned manner, the DOD type printing device SB according to the third embodiment can form a mixed ink which is at the initial temperature $T_0$ and in which only the first ink is in the color-developed state by mixing, in the main container 21, the first ink which is at the initial temperature $T_0$ and in the color-developed state and the second ink which is at the initial temperature $T_0$ and in the decolored state as in the circulation type (charge-control type) printing device S according to the first embodiment. Then, the printing device SB according to the third embodiment can print a print pattern (the temperature indicator 110) on the printing object 100 by spraying the mixed ink in this state as the ink droplets 15 from the ink jet head 10 (the nozzle 11). In addition, the print pattern printed by the printing device SB according to the third embodiment is configured to be unable to return to the initial state once its temperature deviates from the managed temperature range from the second color-development start temperature $T_{d2}$ to the first decoloration start temperature $T_{a1}$. Thereby, the temperature indicator 110 can sense deviation from the managed temperature range.

Note that as in the second embodiment, the printing device SB according to the third embodiment may include an internal temperature adjusting mechanism (not illustrated). The internal temperature adjusting mechanism can adjust, to a predetermined temperature (the initial temperature $T_0$), temperatures of the mixed ink contained in the main container 21 and the mixed ink supplied from the ink supply path 22 to the nozzle 11. Thereby, it is possible to suitably manage the temperatures of the mixed inks before printing.

Fourth Embodiment

Figure 6:
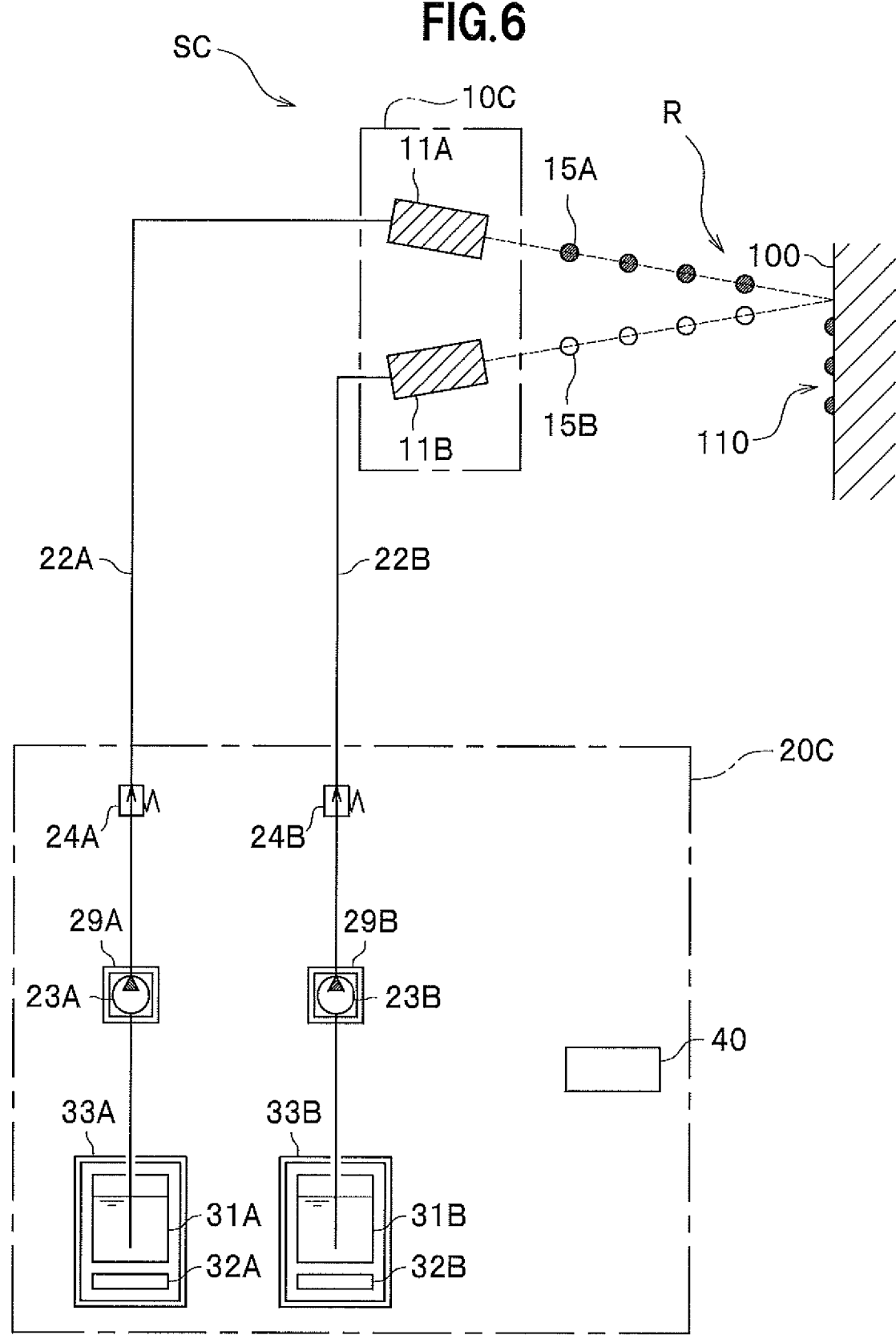
FIG. 6 is a configurational schematic diagram of a printing device according to a fourth embodiment.

A printing device SC according to a fourth embodiment is explained using FIG. 6. FIG. 6 is a configurational schematic diagram of the printing device SC according to the fourth embodiment.

The printing device SC according to the fourth embodiment is a DOD type ink jet printer that sprays the first ink and second ink from separate nozzles 11A, 11B, and includes an ink jet head 10C and a printing device body 20C.

The inkjet head 10C includes the nozzles 11A, 11B. The printing device body 20C includes a first ink supply path 22A, the first ink container 31A, the first temperature adjusting mechanism 32A, the first heat insulating wall 33A, a second ink supply path 22B, the second ink container 31B, the second temperature adjusting mechanism 32B, the second heat insulating wall 33B and a control unit 40. In addition, the first ink supply path 22A is provided with a supply pump 23A and an adjusting valve 24A. The second ink supply path 22B is provided with a supply pump 23B and an adjusting valve 24B.

The first ink contained in the first ink container 31A: is at the initial temperature $T_0$ and in the color-developed state as a result of the processes shown in Step S101 to Step S104 in FIG. 3; is supplied from the nozzle 11A through the first ink supply path 22A; and turns into first ink droplets 15A to be ejected from the nozzle 11A. In addition, the second ink contained in the second ink container 31B: is at the initial temperature $T_0$ and in the decolored state as a result of the processes shown in Step S105 to Step S108 in FIG. 3; is supplied from the nozzle 115 through the second ink supply path 22B; and turns into second ink droplets 15B to be ejected from the nozzle 11B. The ink droplets 15A, 15B ejected from the nozzles 11A, 11B impact on the printing object 100 to form a print pattern (the temperature indicator 110).

In the aforementioned manner, the printing device SC according to the fourth embodiment having a plurality of the nozzles 11A, 115 can print, on the printing object 100, a print pattern (the temperature indicator 110) that cannot return to the initial state once its temperature deviates from the managed temperature range from the second color-development start temperature $T_{d2}$ to the first decoloration start temperature $T_{a1}$, as in the printing devices S to SB according to the first to third embodiments.

Note that if the printing device SC according to the fourth embodiment is used and impact positions of the ink droplets 15A and impact positions of the ink droplets 15B are significantly apart from each other, a print pattern (the temperature indicator 110) can return to the initial state (the state where only the first ink is color-develop) by cooling only a print pattern of the first ink and bringing it into the color-developed state and heating only a print pattern of the second ink and bringing it into the decolored state, even if the print pattern (the temperature indicator 110) deviates from the managed temperature range.

Because of this, the impact positions of the ink droplets 15A and the impact positions of the ink droplets 15B are preferably the same positions. Alternatively, the print pattern of the first ink and the print pattern of the second ink preferably intersect partially. Alternatively, the print pattern of the first ink and the print pattern of the second ink may be printed such that they are arranged sufficiently close to each other. Thereby, forgery of causing a print pattern (the temperature indicator 110) having deviated from the managed temperature range to return to the initial state can be prevented. Note that that the print pattern of the first ink and the print pattern of the second ink are sufficiently close to each other means that they are so close to each other that if only a print pattern of one of the inks is heated or cooled, a print pattern of the other is also heated or cooled and its color-developed/decolored state changes.

In addition, the first ink and second ink may be ejected simultaneously to mix the first ink and second ink on a print surface of the printing object 100. Alternatively, the first ink may be ejected to form a print pattern of the first ink on a print surface of the printing object 100, and thereafter the second ink may be ejected to form a print pattern of the second ink on the print surface of the printing object 100. In addition, the order of ejection of the first ink and second ink may be reversed.

Note that as in the second embodiment, the printing device SC according to the fourth embodiment may include an internal temperature adjusting mechanism (not illustrated). Thereby, it is possible to suitably manage the temperatures of the first ink and second ink before printing.

In addition, although the printing device SC according to the fourth embodiment is explained as being a DOD type ink jet printer, it may be applied to a circulation type (charge-control type) ink jet printer including a plurality of ink jet heads.

Fifth Embodiment

Figure 7:
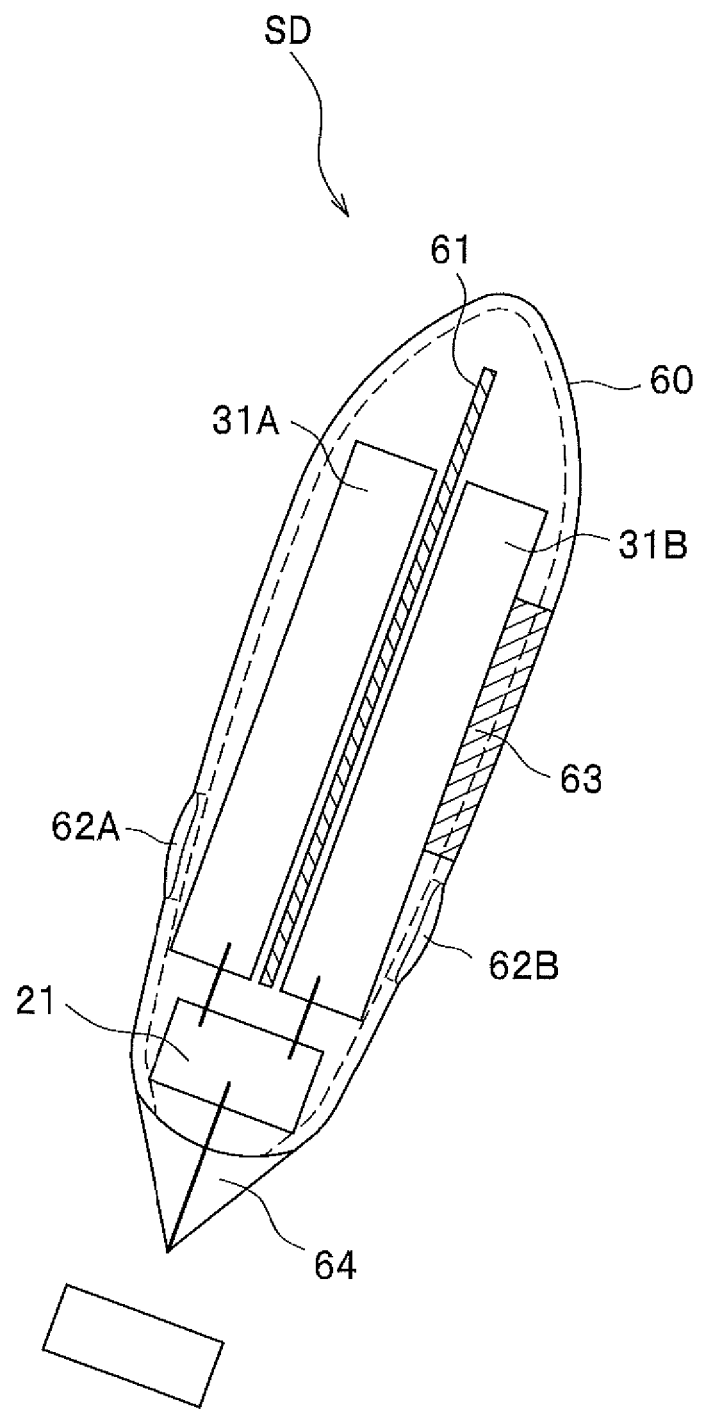
FIG. 7 is a configurational schematic diagram of a writing device according to a fifth embodiment.

A writing device SD according to a fifth embodiment is explained using FIG. 7. FIG. 7 is a configurational schematic diagram of a writing device SD according to the fifth embodiment.

The writing device SD according to the fifth embodiment includes the first ink container 31A that contains the first ink, the second ink container 31B that contains the second ink, the main container 21, a housing 60, a heat insulating wall 61, observation windows 62A, 62B, a heat conducting member 63 and a pen tip portion 64.

It is configured to supply the first ink contained in the first ink container 31A to the main container 21. Likewise, it is configured to supply the second ink contained in the second ink container 31B to the main container 21. The supplied first ink and second ink are mixed in the main container 21 and become a mixed ink. It is configured to supply the mixed ink in the main container 21 to the pen tip portion 64. Thereby, the writing device SD according to the fifth embodiment is configured to be able to write with the mixed ink.

The heat insulating wall 61 is provided between the first ink container 31A and second ink container 31B arranged inside the housing 60.

The observation window 62A is provided on a side of the housing 60, and is configured to be able to enable observation of the color-developed/decolored states of the first ink contained in the first ink container 31A from the outside. Likewise, the observation window 62B is provided on a side of the housing 60, and is configured to be able to enable observation of the color-developed/decolored states of the second ink contained in the second ink container 31B from the outside.

The heat conducting member 63 is provided on a side of the housing 60, and is provided to be able to transfer and receive heat to and from the second ink container 31B.

The first ink and second ink used in the writing device SD according to the fifth embodiment are the same as those used in the printing device S according to the first embodiment, and the same explanations are not repeated.

A use example of the writing device SD according to the fifth embodiment is explained.

First, the entire writing device SD is cooled to a temperature equal to or lower than the first color-development start temperature $T_{d1}$. For example, the writing device SD is put in a freezer and cooled. Thereby, the first ink and second ink enter the color-developed state.

Next, the temperature of the entire writing device SD is adjusted to the initial temperature $T_0$ ("$T_{d2}<T_0<T_{a1}$"). For example, the writing device SD is taken out of the freezer, and is left in a room where writing work is to be performed with the writing device SD. Here, the first ink and second ink remain in the color-developed state. By performing writing in this state, it is possible to perform writing in colors of the first ink and second ink in the color-developed state.

Next, heat is supplied from the heat conducting member 63 to heat the second ink in the second ink container 31B to a temperature equal to or higher than the second decoloration start temperature $T_{a2}$. For example, the second ink is heated with frictional heat generated by rubbing the heat conducting member 63. At this time, it is configured not to transfer heat from the heat conducting member 63 and second ink container 31B to the first ink contained in the first ink container 31A due to the heat insulating wall 61. Thereby, the first ink remains in the color-developed state, and the second ink enters the decolored state.

Next, the temperature of the entire writing device SD is adjusted to the initial temperature $T_0$ ("$T_{d2}<T_0<T_{a1}$"). Here, the first ink remains in the color-developed state, and the second ink remains in the decolored state. By performing writing in this state, it is possible to perform writing in a color of only the first ink in the color-developed state.

In the aforementioned manner, the writing device SD according to the fifth embodiment can form a writing tool that can write with different colors. In addition, by performing writing with the first ink in the color-developed state and the second ink in the decolored state, a writing pattern written thereby is configured to be unable to return to the initial state S0 (the state where the first ink is color-developed, and the second ink is decolored) once its temperature deviates from the managed temperature range from the second color-development start temperature $T_{d2}$ to the first decoloration start temperature $T_{a1}$. Thereby, this writing pattern can sense deviation from the managed temperature range as in the temperature indicator 110 in the first embodiment.

«Ink»

The inks (the first ink and second ink) used in the printing devices S to SC according to the first to fourth embodiments and the writing device SD according to the fifth embodiment are explained further.

The material of an ink that has reversibility in terms of color change and shows a hysteresis color-changing phenomenon in which the color-development start temperature and the decoloration start temperature are different is desirably a composition consisting of a leuco dye which is an electron-donating compound, a developer which is an electron-accepting compound, and a decoloring agent for controlling the temperature range of hysteresis.

The leuco dye is usually colorless or lightly colored, but becomes colored when it contacts the developer. When the decoloring agent coexists with the leuco dye and developer, it can decolor the colored leuco dye when heated. Note that the temperature range of hysteresis largely depends on the melting point and solidifying point of the decoloring agent.

In addition, it is necessary to adjust the hysteresis width of the ink used, depending on managed temperature. For example, if one wishes to manage temperature within the temperature range of 2° C. to 8° C. as in the case of pharmaceuticals, $T_{a1}-T_{d1}$ representing the hysteresis width of the first ink needs to satisfy the relationship $T_{a1}-T_{d1} \geq 6°$ C., and $T_{a2}-T_{d2}$ representing the hysteresis width of the second ink needs to satisfy the relationship $T_{a2}-T_{d2} \geq 6°$ C. In addition, if one wishes to manage temperature within the temperature range of 5° C. to 15° C. as in the case of perishable foods, the relationships $T_{a1}-T_{d1} 10°$ C. and $T_{a2}-T_{d2} \geq 10°$ C. need to be satisfied.

Furthermore, if temperature management of foods, pharmaceuticals or the like is to be performed, one wishes to manage the temperature to keep it within the temperature width of approximately 5° C. to 15° C. often. Because of this, the color-developing temperature $T_{d2}$ of the second ink and the decoloring temperature $T_{a1}$ of the first ink preferably satisfy the relationship $5 \leq T_{a1}-T_{d2} \leq 15°$ C.

(Leuco Dye)

A leuco dye that can be used is one made of an electron-donating compound and conventionally known as a dye for pressure-sensitive copying papers or a dye for heat-sensitive recording papers. For example, examples thereof include triphenyl methane phthalide, fluoran, phenothiazine, indolylphthalide, leuco auramine, spiropyran, rhodamine lactam, triphenyl methane, triazene, spirophthalane xanthene, naphtholactam, azomethine dyes and the like. Specific examples of such a leuco dye include 9-(N-ethyl-N-isopentylamino) spiro[benzo[a]xanthene-12,3'-phthalide], 2-methyl-6-(Np-tolyl-N-ethylamino)-fluoran 6-(diethylamino)-2-[(3-trifluoromethyl)anilino]xanthene-9-spiro-3'-phthalide, 3,3-bis(p-diethylaminophenyl)-6-dimethylaminophthalide, 2'-anilino-6'-(dibutylamino)-3'-methylspiro[phthalide-3,9'-xanthene], 3-(4-diethylamino-2-methylphenyl)-3-(1-ethyl-2-methylindole-3-yl)-4-azaphthalide, 1-ethyl-8-[N-ethyl-N-(4-methylphenyl)amino]-2,2,4-trimethyl-1,2-di hydrospiro[11H-chromeno[2,3-a]quinoline-11,3'-phthalide. In addition, for a temperature indicator printed by making the first ink and second ink overlap one on another, dyes to be colored in non-black colors are particularly preferably used, and furthermore the first ink and the second ink are colored in different colors, in terms of visibility. Specifically, the leuco dye of the first ink is preferably 9-(N-ethyl-N-isopentylamino)spiro[benzo[a]xanthene-12,3'-phthalide], and the leuco dye of the second ink is preferably 3-(4-diethylamino-2-methylphenyl)-3-(1-ethyl-2-methylindole-3-yl)-4-azaphthalide. The combination of the first ink and second ink not limited to this, but may be any combination as long as they become colored in different colors.

In addition, in the present embodiment, one type or a combination of two or more types may be used for the first ink and second ink.

(Developer)

A developer which is an electron acceptor used for an ink in the present embodiment can change the structure of an electron-donating leuco dye and make the leuco dye colored by contacting it. The developer that can be used is one that is known as a developer used for heat-sensitive recording papers, pressure-sensitive copying papers or the like. Specific examples of such a developer include phenols such as benzyl 4-hydroxybenzoate, 2,2'-biphenol, 1,1-bis(3-cyclohexyl-4-hydroxyphenyl)cyclohexane, 2,2-bis(3-cyclohexyl-4-hydroxy-phenyl) propane, bisphenol A, bisphenol F, bis (4-hydroxyphenyl) sulfide, para-hydroxybenzonate or gallic acid ester and the like. The developer is not limited to these examples, but it may be any compound as long as it is an electron acceptor and can change the color of the leuco dye. In addition, carboxylic acid derivative metallates, salicylic acids and salicylic acid metallates, sulfonic acids, sulfonic acid salts, phosphates, metal phosphates, alkyl acid phosphates, acidic phosphate metallate, phosphites, metal phosphites and the like may be used. In particular, one that is highly compatible with a leuco dye or a decoloring agent mentioned below is preferable, and an organic developer such as 2,2'-bisphenol, bisphenol A or gallic acid esters is preferable.

An ink according to the present embodiment may be one type of or a combination of two or more types of these developers or, and furthermore the color density of a leuco dye at the time of coloration can be adjusted by combining them. The amount of use of this developer is selected according to a desired color density. For example, usually, the amount may be selected from the range of approximately 0.1 to 100 parts by weight for one part by weight of the aforementioned leuco dye.

(Decoloring Agent)

A decoloring agent in the present embodiment refers to a compound that can dissociate bonding between a leuco dye and a developer, and is a compound that can control a coloring temperature of the leuco dye and developer. Generally, in a range of temperature at which the leuco dye is colored, the decoloring agent is solidified in a phase-separated state. In addition, in a range of temperature at which the leuco dye is in a decolored state, the decoloring agent is melted, and it is exhibiting the function of dissociating bonding between the leuco dye and the developer. The temperatures of coloration and decoloration of a leuco dye used for an ink in the present embodiment depend on the solidifying point and melting point of the decoloring agent. Because of this, there is desirably a certain temperature difference between the solidifying point and melting point of the decoloring agent. In addition, the temperatures of the melting point or solidifying point depend on the target temperature management range. Specifically, examples thereof include fatty acid ester compounds such as isopropyl myristate, isopropyl palmitate, tricaprylin, tricaprin, trilaurin or trimyristin, and it preferably includes these compounds in terms of the compatibility with the leuco dye and the developer. In addition, it may be one type of or a combination of two or more types of the decoloring agents, and in this case it is possible to adjust the solidifying point and melting point. Of course, it is not limited to these compounds, but examples thereof include other esters, alcohols, ethers, ketones, amides, azomethines, fatty acids, hydrocarbons and the like, for example.

(Microencapsulation)

A combination of a leuco dye, a developer and a decoloring agent used for an ink present embodiment can be used by being dispersed uniformly in an ink, a paint, a synthetic resin or the like like a normal dye or pigment, but preferably is encapsulated independently in microcapsules consisting of resin coatings in terms of storage stability desirably. In particular, if a mixed ink in which the first ink and second ink are mixed according to the first embodiment is used for printing or the like, they are desirably microencapsulated in order for leuco dyes, developers, and decoloring agent of the first ink and second ink not to mix. By microencapsulating them, the environmental resistance against humidity or the like of the compositions improve as mentioned above, and stabilization of storage stability and color-changing characteristics, and the like become possible. In addition, by microencapsulation, influence of other compounds such as resins or additives on leuco dyes, developers and decoloring agents when inks, paints or the like are prepared using them can be suppressed.

Various known approaches can be applied for microencapsulation. For example, examples thereof may include, but are not limited to, emulsion polymerization methods, suspension polymerization methods, coacervation methods, interfacial polymerizations, spray drying methods and the like. In addition, two or more types of different methods may be combined.

Examples of resin coatings used for microcapsules include, but are not limited to, urea resin coatings consisting of polyvalent amine and a carbonyl compound, melamine resin coatings consisting of a melamine.formalin prepolymer, a methylol melamine prepolymer and a methylated melamine prepolymer, urethane resin coatings consisting of polyvalent isocyanate and a polyol compound, amide resin coatings consisting of polybasic acid chloride and polyvalent amine, and vinyl resin coatings consisting of various monomers such as vinyl acetate, styrene, (meta)acrylic ester, acrylonitrile or vinyl chloride. Furthermore, by performing surface treatment on formed resin coatings to adjust the surface energy at the time of preparing an ink or a paint with them, additional processes for improving the dispersion stability of microcapsules and so on can also be performed.

In addition, although depending on a temperature indicator fabrication method, if they are used as an ink or paint, the diameter of microcapsules is preferably in the range of approximately 0.1 to 100 μm, and still preferably in the range of 0.1 to 1 μm as device suitability, storage stability and the like are of concern.

(Ink Solution)

If a charge-control type ink jet printer is used for forming a temperature indicator of the present embodiment, a first ink solution and second ink solution in which the first ink and second ink are dispersed in solvents become necessary. An ink solution contains a resin, a colorant, an additive having polydimethylsiloxane chains, an additive having an alkoxysilane group, a solvent and the like, and these materials are stirred by an overhead stirrer or the like to make them compatible or dispersed with each other, thereby forming an ink. If the resistance of an ink is high, a conductive agent mentioned below is also added.

(Conductive Agent)

If a charge-control type ink jet printer is used for forming a temperature indicator of the present embodiment, a first ink solution and second ink solution in which the first ink and second ink are dispersed in solvents become necessary. If an ink solution has high resistance, ink particles therefrom tend not to fly straight but to be bent at an ink ejecting unit of a charge-control type ink jet printer. Because of this, it is generally necessary to adjust the resistance to a resistance equal to or lower than 2000 Ωcm. The composition of an ink is mainly an organic solvent containing 2-butanone and ethanol as principal components, a resin and a pigment. As these have low conductivity, if an ink is configured only by them, resistance becomes as high as approximately 5000 to tens of thousands Ωcm, and it is difficult to perform desired printing with a charge-control type ink jet printer. In view of this, it is necessary to add a conductive agent. A complex is preferably used as the conductive agent. The conductive agent needs to dissolve in a solvent used, and it is also important that it does not affect a color tone. In addition, the conductive agent used generally has a salt structure. As this has unbalanced electric charges in molecules, it is estimated that it can exhibit high conductivity. As a substance without a salt structure needs to be added to constitute a substantial portion in order to attain a resistance equal to or lower than 2000 Ωcm, it is not appropriate to add it to an ink of the present embodiment.

As a result of examination in these respects, it is found out that suitably the conductive agent has a salt structure and cations have a tetraalkylammonium ion structure. The alkyl chains may either be linear chains or branches, and the solubility to a solvent improves as the carbon number increases. However, the lower the carbon number is, the more the resistance can be lowered with a very low addition rate. A realistic carbon number when it is used in an ink is approximately 2 to 8.

Anions are preferably hexafluorophosphate ions, tetrafluoroborate ions or the like in terms of high solubility to a solvent.

Note that although perchlorate ions also provide high solubility, they have an explosive nature, and so are not realistic to use them for inks. Other than them, examples thereof may include chlorine, bromine and iodine ions, but these are not preferred as they tend to corrode metal such as iron or stainless if they come into contact with each other.

Accordingly, examples of preferred conductive agents include tetraethylammonium hexafluorophosphate, tetrapropylammonium hexafluorophosphate, tetrabutylammonium hexafluorophosphate, tetrapentylammonium hexafluorophosphate, tetrahexylammonium hexafluorophosphate, tetraoctylammonium hexafluorophosphate, tetraethylammonium tetrafluoroborate, tetrapropylammonium tetrafluoroborate, tetrabutylammonium tetrafluoroborate, tetrapentylammonium tetrafluoroborate, tetrahexylammonium tetrafluoroborate, tetraoctylammonium tetrafluoroborate and the like.

Modifications

Note that the printing devices S to SC to writing device SD according to the present embodiments are not limited to the configurations of the aforementioned embodiments, but can be subject to variety of changes as long as such changes do not cause deviation from the gist of the invention.

Although the printing devices S to SC according to the first to fourth embodiments are explained as being charge-control type (circulation type) ink jet printers or DOD type ink jet printers, these are not the sole examples. For example, they may be applied to sealing type (stamp, coder) printing devices.

Although the printing device S according to the first embodiment is explained as including the two temperature adjusting mechanisms, which are the first temperature adjusting mechanism 32A to adjust the temperature of the first ink and the second temperature adjusting mechanism 32S to adjust the temperature of the second ink, this is not the sole example. It may be configured as including only either the first temperature adjusting mechanism 32A or the second temperature adjusting mechanism 32B. In this case, for example, in a configuration including only the first temperature adjusting mechanism 32A, the second ink may be contained in the second ink container 31B in a preliminarily decolored state. In addition, the second heat insulating wall 33B also is removed from the configuration, and the temperature-adjusted space R is temperature-adjusted by an indoor temperature adjusting device (not illustrated); thereby, the second ink also is adjusted to a predetermined temperature (the initial temperature $T_0$). In addition, the printing device SA according to the second embodiment, the printing device SB according to the third embodiment, and the printing device SC according to the fourth embodiment also may be configured in the same manner.

Figure 8:
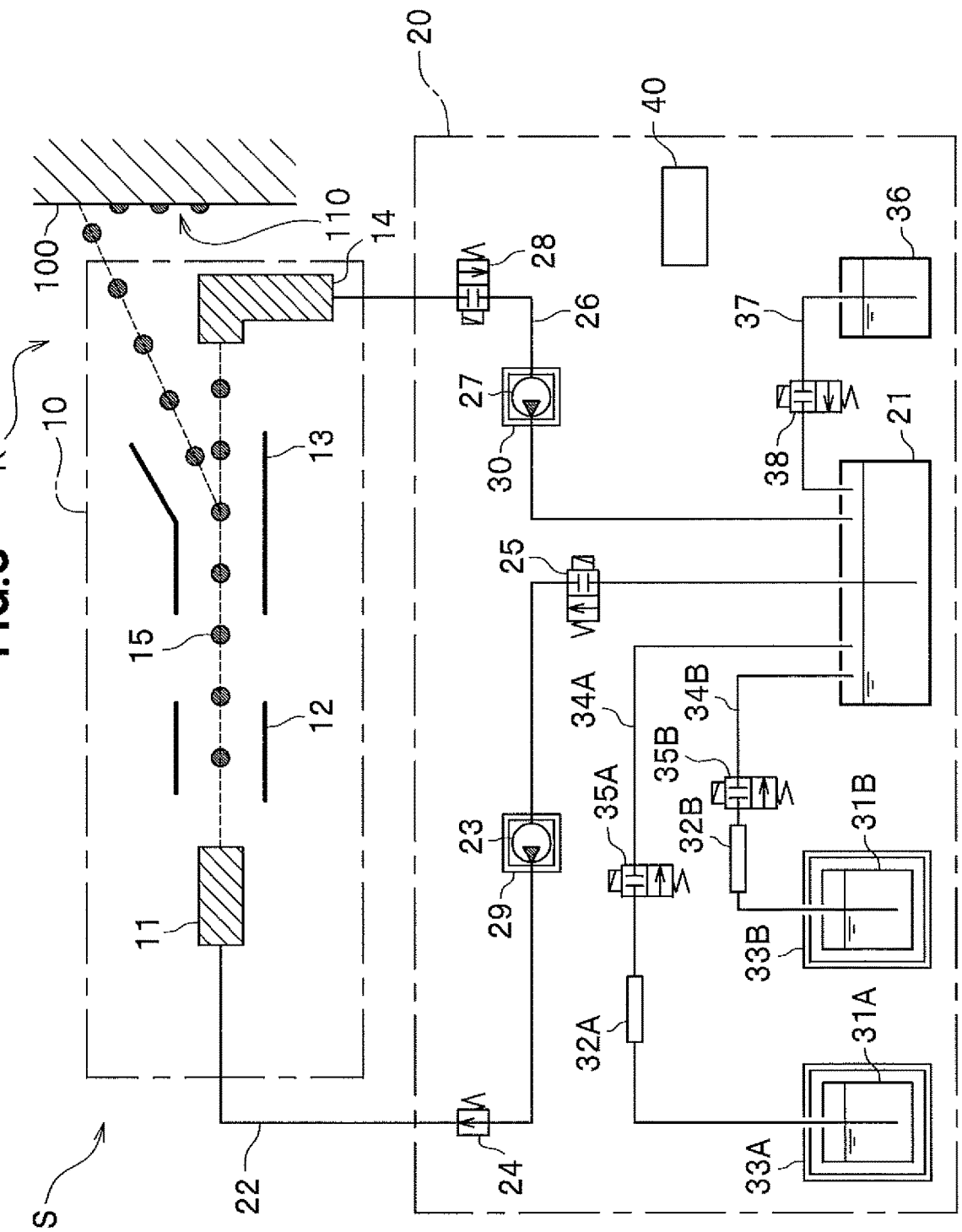
FIG. 8 is a configurational schematic diagram of the printing device according to a first modification.

Although the printing device S according to the first embodiment is explained as including the first temperature adjusting mechanism 32A to adjust the temperature of the first ink being arranged on the side of the first ink container 31A and the second temperature adjusting mechanism 32B to adjust the temperature of the second ink being arranged on the side of the second ink container 31B, this is not the sole example. FIG. 8 is a configurational schematic diagram of the printing device S according to a first modification. As shown in FIG. 8, the first temperature adjusting mechanism 32A may be provided to the first ink supplementation path 34A (preferably upstream of the on-off valve 35A) and the second temperature adjusting mechanism 32B may be provided to the second ink supplementation path 34B (preferably upstream of the on-off valve 35B). In this case, the first temperature adjusting mechanism 32A may include a temperature lowering unit (not illustrated) on the upstream side and a temperature adjusting unit (not illustrated) on the downstream side, and after the temperature of the first ink is adjusted to a temperature equal to or lower than the first color-development start temperature $T_{d1}$ by the temperature lowering unit, the temperature of the first ink may be adjusted to be the initial temperature $T_0$ by the temperature adjusting unit. In addition, the second temperature adjusting mechanism 32B may include a temperature raising unit (not illustrated) on the upstream side and a temperature adjusting unit (not illustrated) on the downstream side, and after the temperature of the second ink is adjusted to a temperature equal to or higher than the second decoloration start temperature $T_{a2}$ by the temperature raising unit, the temperature of the second ink may be adjusted to the initial temperature $T_0$ by the temperature adjusting unit.

In addition, the same applies also to the printing device SA according to the second embodiment and the printing device SB according to the third embodiment. The first temperature adjusting mechanism 32A may be provided to the first ink supplementation path 34A (preferably upstream of the on-off valve 35A) and the second temperature adjusting mechanism 32B may be provided to the second ink supplementation path 34B (preferably upstream of the on-off valve 35B). In addition, the same applies also to the printing device SC according to the fourth embodiment. The first temperature adjusting mechanism 32A may be provided to the ink supply path 22A (preferably upstream of the supply pump 23A), and the second temperature adjusting mecha- nism 32B may be provided to the ink supply path 22B (preferably upstream of the supply pump 23B).

Figure 9:
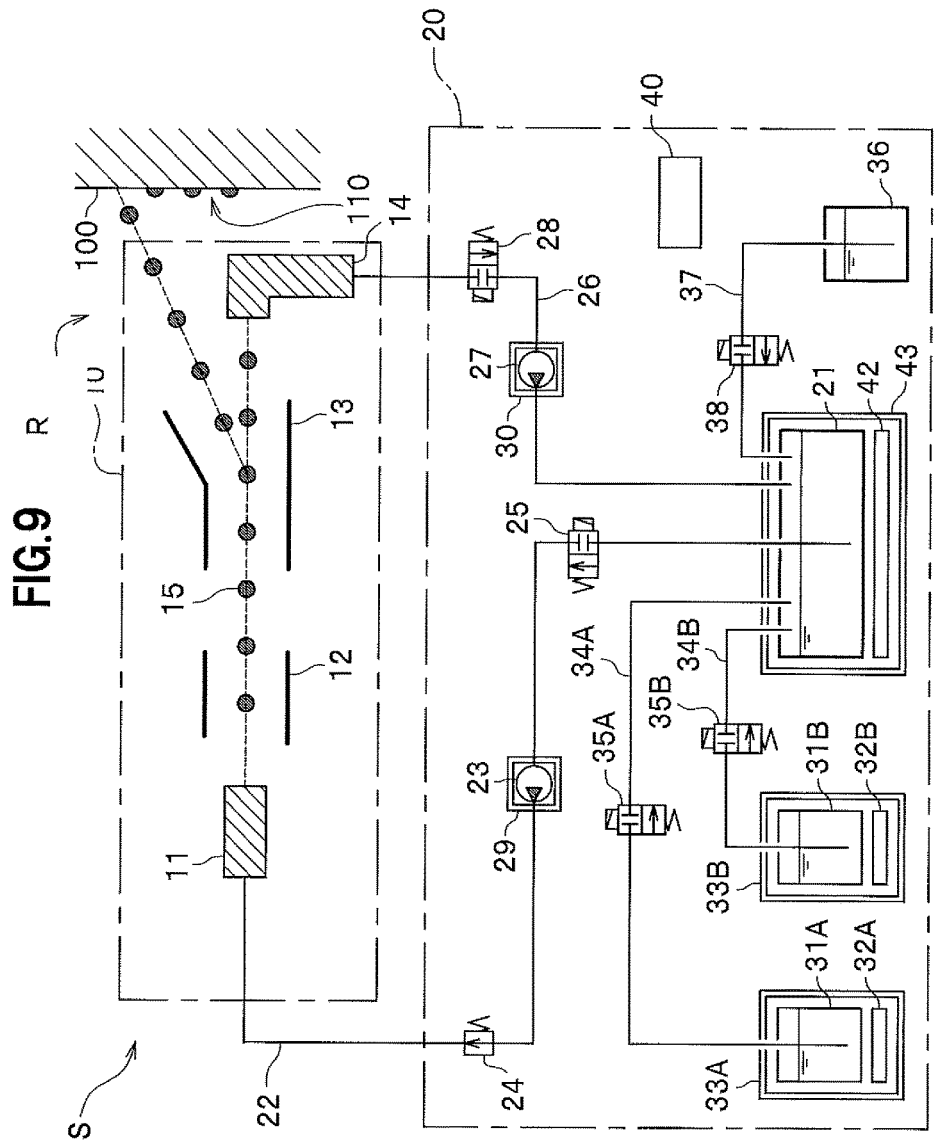
FIG. 9 is a configurational schematic diagram of the printing device according to a second modification.

Although the printing device S according to the first embodiment is explained as temperature-adjusting the temperature-adjusted space R with the indoor temperature adjusting device (not illustrated) to thereby adjust the temperature of a mixed ink contained in the main container 21 ($T_{d2}<T_0<T_{a1}$), and the printing device SA according to the second embodiment is explained as temperature-adjusting the inside of the printing device SA with the internal temperature adjusting mechanism 39 to thereby adjust the temperature of a mixed ink contained in the main container 21 ($T_{d2}<T_0<T_{a1}$), these are not the sole examples. FIG. 9 is a configurational schematic diagram of the printing device S according to a second modification. As shown in FIG. 9, it may be configured such that a third temperature adjusting mechanism 42 is arranged inside a heat insulating wall 43 together with the main container 21, and the third temperature adjusting mechanism 42 can adjust the temperature of a mixed ink contained in the main container 21. In addition, it is preferably configured such that the temperature of the mixed ink adjusted by the third temperature adjusting mechanism 42 is maintained by covering paths through which the mixed ink flows (the ink supply path 22, ink recovery path 26 and the like) for example with an insulating material (not illustrated). In addition, the printing device SB according to the third embodiment may be configured in the same manner.

LIST OF REFERENCE SIGNS

S, SA, SB, SC: printing device
10, 10B, 10C: ink jet head
11, 11A, 11B: nozzle
12: charging electrode
13: deflecting electrode
14: gutter
20, 20B, 20C: printing device body
21: main container (mixed ink container)
22, 22A, 22B: ink supply path
23, 23A, 23B: supply pump
26: ink recovery path
27: recovery pump
29, 29A, 29B, 30: heat insulating wall
31A: first ink container
32A: first temperature adjusting mechanism (first temperature adjusting unit)
33A: first heat insulating wall (first heat insulating portion)
31B: second ink container
32B: second temperature adjusting mechanism (second temperature adjusting unit)
33B: second heat insulating wall (second heat insulating portion)
34A: first ink supplementation path
34B: second ink supplementation path
36: solvent container
37: solvent supplementation path
39: internal temperature adjusting mechanism (internal temperature adjusting unit)
40: control unit
42: third temperature adjusting mechanism
43: heat insulating wall
15: ink droplet
100: printing object
110: temperature indicator
R: temperature-adjusted space
SD: writing device 60: housing
61: heat insulating wall (heat insulating portion)
62A, 62B: observation window
63: heat conducting member
64: pen tip portion (writing unit)

The invention claimed is:

1. A printing device comprising:
   a first ink container that contains a first ink;
   a second ink container that contains a second ink;
   a temperature adjusting unit that adjusts at least either temperature of the first ink contained in the first ink container or temperature of the second ink contained in the second ink container;
   a nozzle that sprays an ink; and
   a control unit that controls the temperature adjusting unit,
   wherein the temperature adjusting unit has a cooling mechanism and a heating mechanism,
   wherein the first ink and the second ink are inks that change in color reversibly as a result of temperature change, and have different color-development start temperatures and decoloration start temperatures, and
   wherein, assuming that a decoloration start temperature of the first ink is $T_{a1}$, a color-development start temperature of the first ink is $T_{d1}$, a decoloration start temperature of the second ink is $T_{a2}$ and a color-development start temperature of the second ink is $T_{d2}$, a relationship of $T_{d1} < T_{d2} < T_{a1} < T_{a2}$ is satisfied.

2. The printing device according to claim 1,
   wherein the temperature adjusting unit has:
   a first temperature adjusting unit that adjusts temperature of the first ink contained in the first ink container; and
   a second temperature adjusting unit that adjusts temperature of the second ink contained in the second ink container.

3. The printing device according to claim 1,
   wherein the nozzle has a first nozzle that sprays the first ink and a second nozzle that sprays the second ink, and the printing device further comprises:
   a first ink supply path that supplies the first ink from the first ink container to the first nozzle; and
   a second ink supply path that supplies the second ink from the second ink container to the second nozzle.

4. The printing device according to claim 1, further comprising:
   a first heat insulating portion in which the first ink container and first temperature adjusting unit are arranged and which insulates from an outside; and
   a second heat insulating portion in which the second ink container and second temperature adjusting unit are arranged and which insulates from an outside.

5. The printing device according to claim 1,
   wherein the control unit:
   controls a first temperature adjusting unit to adjust the temperature of the first ink to a temperature equal to or lower than $T_{d1}$, and thereafter adjusts the temperature to a temperature $T_0$ which is higher than $T_{d2}$ and lower than $T_{a1}$; and
   controls a second temperature adjusting unit to adjust the temperature of the second ink to a temperature equal to or higher than $T_{a2}$, and thereafter adjusts the temperature to the temperature $T_0$.

6. A printing device comprising:
   a first ink container that contains a first ink;
   a second ink container that contains a second ink;
   a temperature adjusting unit that adjusts at least either temperature of the first ink contained in the first ink container or temperature of the second ink contained in the second ink container;
   a nozzle that sprays an ink;
   a control unit that controls the temperature adjusting unit,
   wherein the temperature adjusting unit has a cooling mechanism and a heating mechanism, and
   wherein the first ink and the second ink are inks that change in color reversibly as a result of temperature change, and have different color-development start temperatures and decoloration start temperatures;
   an ink container;
   a first ink supplementation path that supplies the first ink from the first ink container to the ink container;
   a second ink supplementation path that supplies the second ink from the second ink container to the ink container; and
   an ink supply path that supplies, from the ink container to the nozzle, a mixed ink in which the first ink and the second ink are mixed,
   wherein the nozzle sprays the mixed ink in which the first ink and the second ink are mixed.

7. The printing device according to claim 6, wherein the temperature adjusting unit adjusts at least either temperature of the first ink or temperature of the second ink before mixing of the first ink and the second ink.

8. The printing device according to claim 6, further comprising an internal temperature adjusting unit that adjusts temperature of the ink container.

* * * * *